(12) United States Patent
Kaneda

(10) Patent No.: US 9,847,841 B1
(45) Date of Patent: Dec. 19, 2017

(54) I/Q IMBALANCE CORRECTION FOR AN OPTICAL-TRANSPORT SYSTEM

(71) Applicant: Alcatel-Lucent USA Inc., Murray Hill, NJ (US)

(72) Inventor: Noriaki Kaneda, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/379,154

(22) Filed: Dec. 14, 2016

(51) Int. Cl.
- H04B 10/61 (2013.01)
- H04B 10/40 (2013.01)
- H04B 10/548 (2013.01)

(52) U.S. Cl.
CPC ......... H04B 10/6161 (2013.01); H04B 10/40 (2013.01); H04B 10/548 (2013.01)

(58) Field of Classification Search
CPC ... H04B 10/6161; H04B 10/40; H04B 10/548
See application file for complete search history.

(56) References Cited

U.S. PATENT DOCUMENTS

| | | | |
|---|---|---|---|
| 7,450,919 B1 * | 11/2008 | Chen | H04B 1/30 455/226.1 |
| 8,233,524 B2 | 7/2012 | Thirumoorthy | |
| 8,798,207 B2 | 8/2014 | Wertz et al. | |
| 8,971,465 B2 | 3/2015 | Varanese et al. | |
| 9,203,682 B2 | 12/2015 | Winzer et al. | |
| 2003/0007574 A1 | 1/2003 | Li et al. | |
| 2003/0072393 A1 | 4/2003 | Gu | |
| 2005/0196176 A1 | 9/2005 | Sun et al. | |
| 2010/0008449 A1 | 1/2010 | Sayers | |

(Continued)

FOREIGN PATENT DOCUMENTS

WO 2013010781 A1 1/2013

OTHER PUBLICATIONS

Zarei, Shahram, et al., "I/Q Imbalance Aware Widely-Linear Channel Estimation and Detection for Uplink Massive MIMO Systems," (ISWCS), International Symposium on Wireless Communication Systems, 2015, (5 pages).

(Continued)

Primary Examiner — Shi K Li
Assistant Examiner — Mina Shalaby
(74) Attorney, Agent, or Firm — Mendelsohn Dunleavy, P.C.; Yuri Gruzdkov

(57) ABSTRACT

A coherent optical receiver that is capable of obtaining separate estimates of the I/Q phase imbalances caused by the front-end circuits of the receiver and transmitter. In an example embodiment, the receiver's I/Q imbalance is estimated using equalization coefficients of a first digital equalizer located upstream from the carrier-recovery module in the train of digital-signal processing implemented at the receiver, whereas the transmitter's I/Q imbalance is estimated using equalization coefficients of a second digital equalizer located downstream from the carrier-recovery module. The receiver DSP can then use the first estimate to carry out signal processing that reduces adverse effects of the receiver's I/Q imbalance on data recovery at the receiver. The receiver can also provide the estimate of the transmitter's I/Q phase imbalance to the transmitter, which can then perform digital signal pre-distortion directed at compensating that I/Q imbalance at the transmitter.

20 Claims, 6 Drawing Sheets

(56) References Cited

U.S. PATENT DOCUMENTS

| | | |
|---|---|---|
| 2010/0142952 A1 | 6/2010 | Qian et al. |
| 2011/0142449 A1 | 6/2011 | Xie |
| 2012/0057863 A1* | 3/2012 | Winzer .................. H04B 10/60 398/3 |
| 2016/0056990 A1 | 2/2016 | Sestok, IV |
| 2017/0126465 A1* | 5/2017 | Kim .................... H04L 27/3863 |

OTHER PUBLICATIONS

Li, Yabo, et al., "A New Method to Simultaneously Estimate TX/RX IQ Imbalance and Channel for OFDM Systems," IEEE ICC Signal Processing for Communications Symposium, 2013, pp. 4551-4555.

* cited by examiner

112

I/Q IMBALANCE CORRECTION FOR AN OPTICAL-TRANSPORT SYSTEM

BACKGROUND

Field

The present disclosure relates to optical communication equipment and, more specifically but not exclusively, to I/Q imbalance correction for an optical-transport system.

Description of the Related Art

This section introduces aspects that may help facilitate a better understanding of the disclosure. Accordingly, the statements of this section are to be read in this light and are not to be understood as admissions about what is in the prior art or what is not in the prior art.

A modulated optical signal that carries a constellation symbol typically has an in-phase (I) component and a quadrature (Q) component. Ideally, the I and Q components are orthogonal to one another. However, implementation imperfections, such as incorrect biasing of an optical mixer, imperfect signal splitting in optical couplers, variability in the optical-to-electrical (O/E) conversion characteristics of photodiodes, etc., can create amplitude and/or phase imbalances between the I and Q sub-channels, both at the transmitter and the receiver. These imbalances tend to destroy the orthogonality between the I and Q components of the optical signal and disadvantageously translate into a bit-error-rate (BER) penalty, which rapidly grows with an increase of the constellation size, e.g., to a size larger than the four constellation points employed by the quadrature-phase-shift-keying (QPSK) constellation.

SUMMARY OF SOME SPECIFIC EMBODIMENTS

Disclosed herein are various embodiments of a coherent optical receiver that is capable of obtaining separate estimates of the I/Q phase imbalances caused by the front-end circuits of the receiver and transmitter. In an example embodiment, the receiver's I/Q phase imbalance is estimated using equalization coefficients of a first digital equalizer located upstream from the carrier-recovery module in the train of digital-signal processing implemented at the receiver, whereas the transmitter's I/Q phase imbalance is estimated using equalization coefficients of a second digital equalizer located downstream from the carrier-recovery module. The receiver DSP can then use the first estimate to carry out signal processing that reduces adverse effects of the receiver's I/Q phase imbalance on data recovery at the receiver. The receiver can also provide the estimate of the transmitter's I/Q phase imbalance to the transmitter, which can then perform digital signal pre-distortion directed at compensating that I/Q phase imbalance at the transmitter.

In some embodiments, the above-indicated I/Q phase imbalances can be estimated and compensated in a frequency-dependent manner within the bandwidth of the corresponding optical communication signal.

In some embodiments, the above-indicated I/Q phase imbalances can be separately estimated and compensated for different polarization components of the optical communication signal.

Advantageously, the disclosed estimation of the above-indicated I/Q phase imbalances does not require any special pilot signals or sequences and can be performed in situ during transmission of payload data.

According to an example embodiment, provided is an apparatus comprising: a front-end circuit configured to mix an optical input signal and an optical local-oscillator signal to generate a first electrical digital signal and a second electrical digital signal, the first electrical digital signal being a digital measure of a first I component of the optical input signal, and the second electrical digital signal being a digital measure of a first Q component of the optical input signal; and a digital signal processor configured to: process the first and second electrical digital signals to recover data encoded onto the first I and Q components of the optical input signal; generate an estimate of a first I/Q phase imbalance using one or more digital signals generated therein, the first I/Q phase imbalance being an I/Q imbalance caused by the front-end circuit; and generate an estimate of a second I/Q phase imbalance using one or more digital signals generated therein, the second I/Q phase imbalance being an I/Q imbalance caused by an optical transmitter that applied the optical input signal to the front-end circuit.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
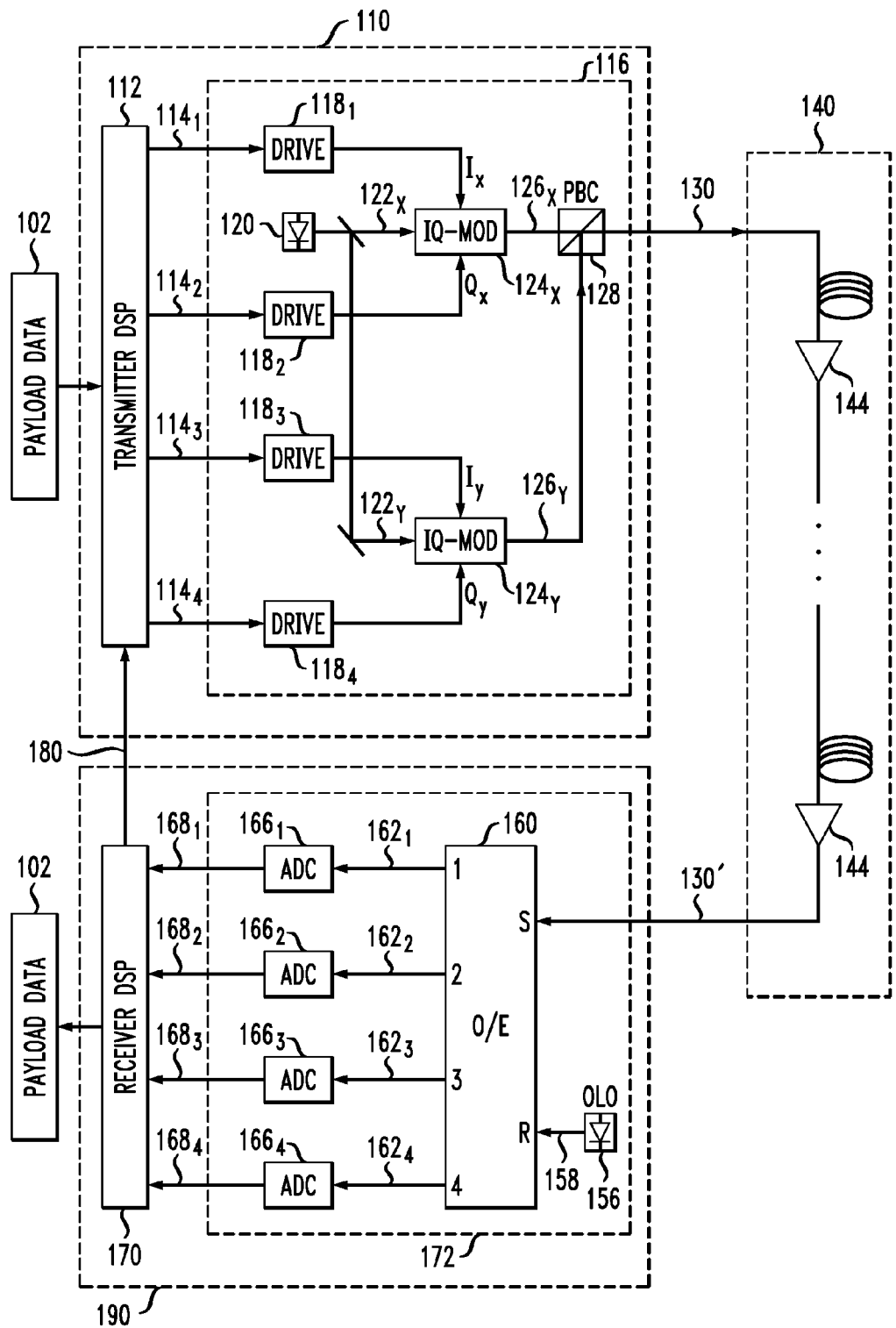
FIG. 1 shows a block diagram of an optical transport system according to an embodiment.

FIG. 1 shows a block diagram of an optical transport system 100 according to an embodiment of the disclosure. System 100 has an optical transmitter 110 and an optical receiver 190 coupled to one another via an optical transport link 140. Transmitter 110 and receiver 190 are also coupled to one another by way of a control link 180, which can be used, e.g., by the receiver to send feedback and/or control signals to the transmitter. In an example embodiment, control link 180 can be implemented using the control plane of system 100 and/or over an Internet connection.

In operation, transmitter 110 receives a digital electrical input stream 102 of payload data and applies it to a digital signal processor (DSP) 112. DSP 112 processes input data stream 102 to generate digital signals $114_1$-$114_4$. In an example embodiment, DSP 112 may perform, inter alia, one or more of the following: (i) de-multiplex input stream 102 into two sub-streams, each intended for optical transmission using a respective one of the orthogonal (e.g., X and Y) polarizations of an optical output signal 130; (ii) encode each of the sub-streams using a suitable code, e.g., to prevent error propagation and enable error correction at receiver 190; (iii) convert each of the two resulting sub-streams into a corresponding sequence of constellation symbols; and (iv) perform digital signal pre-distortion, e.g., to mitigate the adverse effects of the I/Q phase imbalance imposed by an electrical-to-optical (E/O) converter (also sometimes referred to as a front-end circuit) 116 of transmitter 110. In each signaling interval (also referred to as a symbol period or time slot), signals $114_1$ and $114_2$ carry digital values that represent the in-phase (I) component and quadrature (Q) component, respectively, of a corresponding (possibly pre-distorted) constellation symbol intended for transmission using a first (e.g., X) polarization of light. Signals $114_3$ and $114_4$ similarly carry digital values that represent the I and Q components, respectively, of the corresponding (possibly pre-distorted) constellation symbol intended for transmission using a second (e.g., Y) polarization of light.

E/O converter 116 operates to transform digital signals $114_1$-$114_4$ into a corresponding modulated optical output signal 130. More specifically, drive circuits $118_1$ and $118_2$ transform digital signals $114_1$ and $114_2$, as known in the art, into electrical analog drive signals $I_X$ and $Q_X$, respectively. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 1, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively. In response to drive signals $I_Y$ and $Q_Y$, an I-Q modulator $124_Y$ operates to modulate a Y-polarized beam $122_Y$ of light supplied by laser source 120 as indicated in FIG. 1, thereby generating a modulated optical signal $126_Y$. A polarization beam combiner 128 operates to combine modulated optical signals $126_X$ and $126_Y$, thereby generating optical output signal 130. Optical output signal 130 is then applied to optical transport link 140.

Optical transport link 140 is illustratively shown as being an amplified optical link having a plurality of optical amplifiers 144 configured to amplify the optical signals that are being transported through the link, e.g., to counteract signal attenuation. Note that optical transport link 140 that has only one or even no optical amplifiers 144 can similarly be used in an alternative embodiment. After propagating through optical transport link 140, optical signal 130 becomes optical signal 130', which is applied to receiver 190. Optical signal 130' may differ from optical signal 130 because optical transport link 140 typically adds noise and imposes various signal distortions, e.g., due to chromatic dispersion, polarization rotation, and polarization-mode dispersion therein.

Receiver 190 has a front-end circuit 172 comprising an optical-to-electrical (O/E) converter 160, analog-to-digital converters (ADCs) $166_1$-$166_4$, and an optical local-oscillator (OLO) source 156. O/E converter 160 has (i) two input ports labeled S and R and (ii) four output ports labeled 1 through 4. Input port S receives optical signal 130' from optical transport link 140. Input port R receives an OLO signal 158 generated by OLO source 156. OLO signal 158 has an optical-carrier frequency (wavelength) that is sufficiently close to that of signal 130' to enable coherent (e.g., intradyne) detection of the latter signal. OLO signal 158 can be generated, e.g., using a relatively stable tunable laser whose output wavelength (frequency) is approximately the same as the carrier wavelength (frequency) of optical signal 130'.

In an example embodiment, O/E converter 160 operates to mix input signal 130' and OLO signal 158 to generate eight different mixed (e.g., by interference) optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog I signal and an analog Q signal, respectively, corresponding to a first (e.g., horizontal, h) polarization component of signal 130'. Electrical signals $162_3$ and $162_4$ may similarly be an analog I signal and an analog Q signal, respectively, corresponding to a second (e.g., vertical, v) polarization component of signal 130'. Note that the orientation of the h and v polarization axes at receiver 190 may not coincide with the orientation of the X and Y polarization axes at transmitter 110.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a DSP 170 (e.g., as further described below in reference to FIGS. 2-5) to recover the data of the original input data stream 102 applied to transmitter 110. In an example embodiment, DSP 170 may perform, inter alia, one or more of the following: (i) perform signal processing that enables separate estimation of the I/Q phase imbalance imposed by front-end circuit 116 of transmitter 110 and the I/Q phase imbalance imposed by front-end circuit 172 of receiver 190; (ii) generate and transmit, by way of control link 180, a control signal that communicates to DSP 112 the estimated I/Q phase imbalance corresponding to front-end circuit 116 of transmitter 110; (iii) carry out signal processing that uses the estimated I/Q phase imbalance corresponding to front-end circuit 172 of receiver 190 to mitigate the adverse effects the latter I/Q phase imbalance; (iv) perform electronic polarization de-multiplexing; and (v) perform error correction based on the data encoding applied at DSP 112. DSP 112 can advantageously use the estimated I/Q phase imbalance communicated to it by DSP 170 to properly set the parameters of the digital signal pre-distortion performed thereat, e.g., as described below in reference to FIG. 6.

As will be clear from the following description, the estimation of the I/Q phase imbalances used in system 100 does not require any special pilot signals or sequences and can be performed in situ during transmission of payload data. In an example embodiment, the estimation provides a set of parameters that can then be used to configure appropriate digital signal-processing modules of transmitter 110 and receiver 190 to reduce or cancel the adverse effects of the I/Q phase imbalances, thereby advantageously improving the BER performance of system 100.

Figure 2:
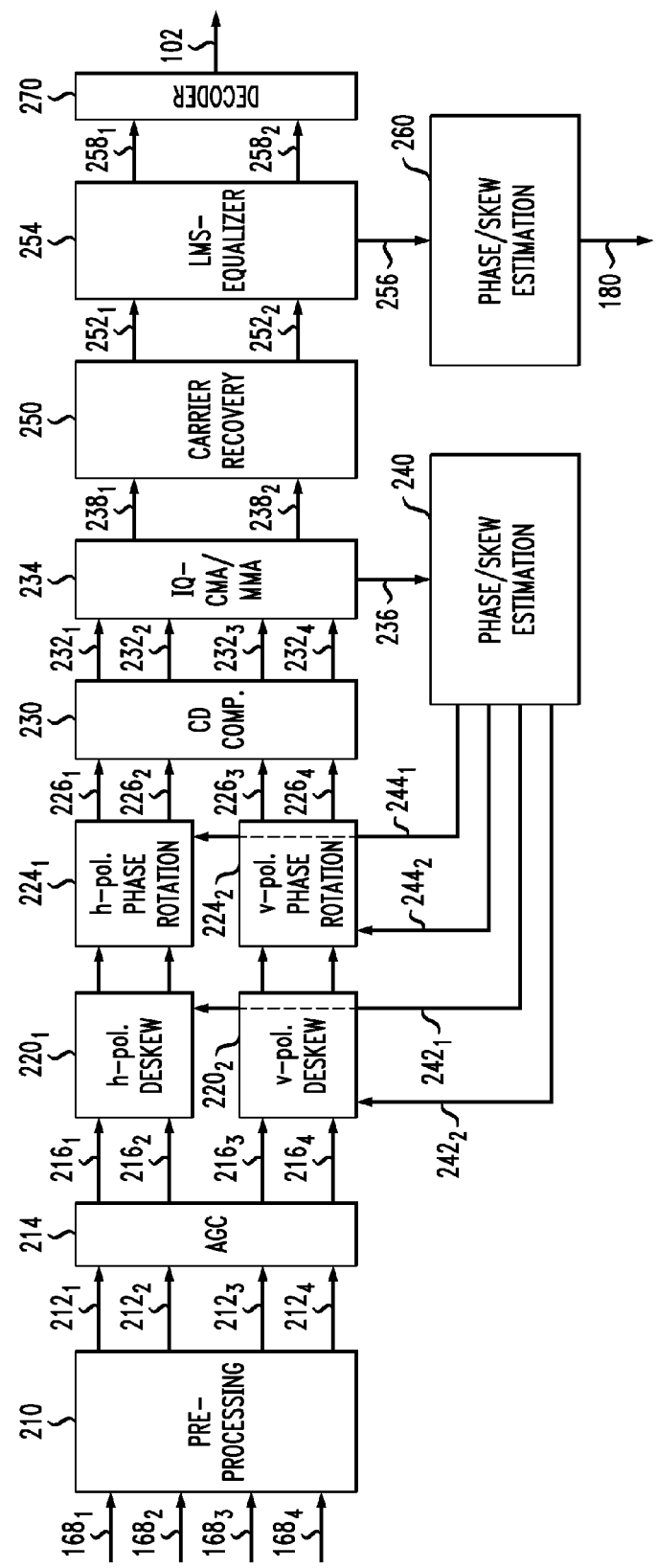
FIG. 2 shows a block diagram of a digital circuit that can be used in the optical transport system of FIG. 1 according to an embodiment.

FIG. 2 shows a block diagram of DSP 170 (FIG. 1) according to an embodiment. Digital signals $168_1$-$168_4$, output data stream 102, and control link 180 are also shown in FIG. 2 to better illustrate the relationship between the circuits shown in FIGS. 1 and 2.

Ideally, digital signals $168_1$ and $168_2$ represent the I and Q components, respectively, of the horizontal polarization component of optical signal 130', and digital signals $168_3$ and $168_4$ represent the I and Q components, respectively, of the vertical polarization component of that optical signal. However, various transmission impairments, front-end implementation imperfections, and configuration inaccuracies generally cause each of digital signals $168_1$-$168_4$ to be a convoluted signal that has various signal distortions and/or contributions from various signal components originally generated at transmitter 110 (FIG. 1). The train of signal processing implemented in DSP 170 is generally directed at reducing the adverse effects of various signal distortions and de-convolving digital signals $168_1$-$168_4$ so that the transmitted data can be properly recovered to generate output data stream 102.

For example, DSP 170 is designed and configured to separately estimate the I/Q phase imbalance corresponding to optical transmitter 110 and the I/Q phase imbalance corresponding to optical receiver 190. As already indicated above, the main source of the I/Q phase imbalance at optical transmitter 110 is front-end circuit 116, whereas the main source of the I/Q phase imbalance at optical receiver 190 is front-end circuit 172. Typically, each of these I/Q phase imbalances is caused by the differences in the lengths of the signal-propagation paths in the I and Q sub-channels of the corresponding front-end circuit.

The separate estimation of the I/Q phase imbalances is performed using phase/skew estimation modules 240 and 260, respectively. As indicated in FIG. 2, phase/skew estimation module 240 is configured to (i) receive a digital input signal 236 from a processing module (e.g., CMA/MMA equalizer) 234 located upstream from a carrier-recovery module 250 and (ii) estimate the I/Q phase imbalance mainly caused by front-end circuit 172 of receiver 190 based on that digital input signal. In contrast, phase/skew estimation module 260 is configured to (i) receive a digital input signal 256 from a processing module (e.g., LMS equalizer) 254 located downstream from carrier-recovery module 250 and (ii) estimate the I/Q phase imbalance mainly caused by front-end circuit 116 of transmitter 110 based on that digital input signal.

The intradyne detection implemented at optical receiver 190 generally causes the detected signal samples to rotate about the origin of the complex plane at an angular speed that is proportional to the frequency difference ($\delta f$) between the carrier frequency of input optical signal 130' and the carrier frequency of OLO signal 158. As a result, any I/Q phase imbalance caused by front-end circuit 116 of transmitter 110 tends to affect digital signals $168_1$-$168_4$ approximately equally and, as such, does not typically affect the outcome of the signal-processing algorithms executed by modules 234 and 240. The signal processing implemented in carrier-recovery module 250 is directed at cancelling the frequency difference $\delta f$ and generally stops the angular rotation of the signal samples carried by digital signals $252_1$ and $252_2$ generated by carrier-recovery module 250. As a result, the I/Q phase imbalance (if any) caused by front-end circuit 116 of transmitter 110 can now be detected and estimated by appropriately processing digital signals $252_1$ and $252_2$ using modules 254 and 260. Example signal-processing algorithms that can be used in processing modules 234, 240, 254, and 260 of DSP 170 for these purposes are described in more detail below in reference to FIGS. 2-5.

Continuing to refer to FIG. 2, DSP 170 comprises a signal-pre-processing module 210 configured to receive digital signals $168_1$-$168_4$. One of the functions of module 210 may be to adapt the signal samples received via digital signals $168_1$-$168_4$ to a form that is more-suitable for the signal-processing algorithms implemented in the downstream modules of DSP 170. The resulting digital signals generated by signal-pre-processing module 210 are labeled $212_1$-$212_4$.

DSP 170 further comprises an automatic-gain-control (AGC) module 214, deskew modules $220_1$ and $220_2$, and phase-rotation modules $224_1$ and $224_2$. The operative configurations of deskew modules $220_1$ and $220_2$ are controlled by control signals $242_1$ and $242_2$, respectively, generated by phase/skew estimation module 240 as described in more detail below. The operative configurations of phase-rotation modules $224_1$ and $224_2$ are controlled by control signals $244_1$ and $244_2$, respectively, also generated by phase/skew estimation module 240 as described in more detail below.

AGC module 214 operates to correct amplitude imbalances (if any) in digital signals $212_1$-$212_4$. A person of ordinary skill in the art will understand that some or all of the amplitude imbalances in digital signals $212_1$-$212_4$ may be caused by the above-mentioned I/Q imbalances imposed by front-end circuits 116 and 172. In an example embodiment, AGC module 214 generates digital signals $216_1$-$216_4$, each having a controlled amplitude, by applying variable-gain amplification to digital signals $212_1$-$212_4$, respectively. AGC module 214 can dynamically adjust the gain(s) applied to digital signals $212_1$-$212_4$ as known in the pertinent art, e.g., using closed-loop feedback to maintain desired average or peak signal levels for digital signals $216_1$-$216_4$.

In the first-order approximation, the I/Q phase imbalance ($\Delta\theta_h$) between digital signals $216_1$ and $216_2$ can be expressed using Eq. (1) as follows:

$$\Delta\theta_h(f) = (\theta_{0h} - 90°) + (f - f_0)\beta_{1h} \quad (1)$$

where f is the frequency that varies from ($f_0 - \Delta f$) to ($f_0 + \Delta f$); $f_0$ is the carrier frequency of optical input signal 130'; $2\Delta f$ is the signal bandwidth; $\theta_{0h}$ is the phase difference between digital signals $216_1$ and $216_2$ at the carrier frequency; and $\beta_{1h}$ is the group delay between the electrical signals representing the I and Q components of the horizontal polarization in front-end circuit 172 of receiver 190. The I/Q phase imbalance ($\Delta\theta_v$) between digital signals $216_3$ and $216_4$ can similarly be expressed using Eq. (2):

$$\Delta\theta_v(f) = (\theta_{0v} - 90°) + (f - f_0)\beta_{1v} \quad (2)$$

where $\theta_{0v}$ is the phase difference between digital signals $216_3$ and $216_4$ at the carrier frequency; and $\beta_{1v}$ is the group delay between the electrical signals representing the I and Q components of the vertical polarization in front-end circuit 172 of receiver 190.

Figure 3:
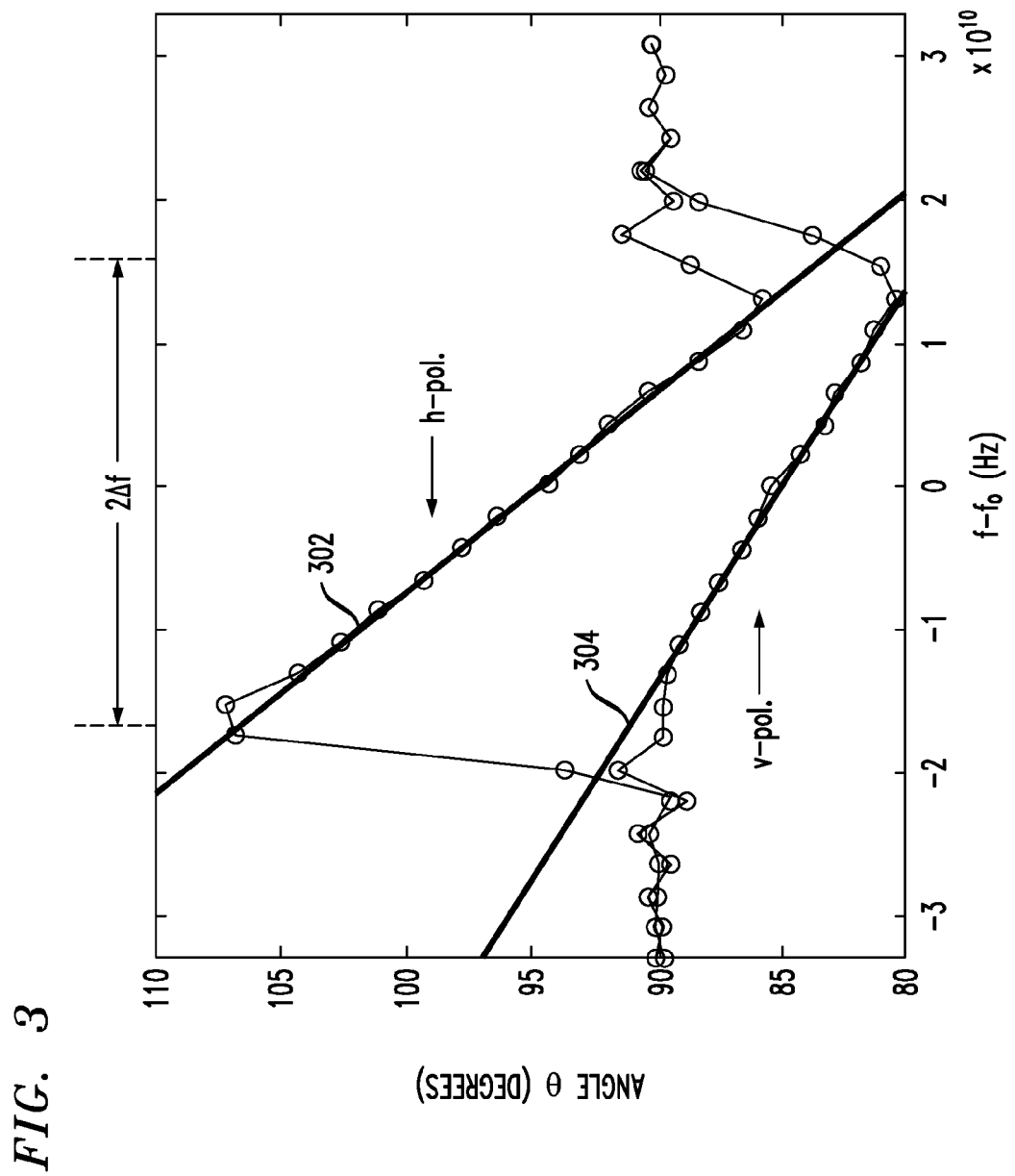
FIG. 3 graphically shows an example of I/Q phase imbalances in the optical transport system of FIG. 1 according to an embodiment.

FIG. 3 graphically shows an example of the above-indicated I/Q phase imbalances. More specifically, the two sets of data points shown in FIG. 3 are obtained using computer simulations of system 100, wherein the polarization-division-multiplexed optical signal 130 carries QPSK constellation symbols at a rate of 33 GBd. One set of data points in FIG. 3 corresponds to the horizontal polarization (h-pol.), and the other set of data points corresponds to the vertical polarization (v-pol.), as indicated by the corresponding arrows. The ordinate of the graph represents the relative phase $\theta$ between the I and Q signal components. In the absence of the I/Q phase imbalance (i.e., if $\Delta\theta=0$), the phase $\theta$ is 90 degrees and does not depend on the frequency f.

The line in FIG. 3 that is labeled 302 shows a linear fit of the h-polarization data points that has been generated using Eq. (1), with the phase $\theta_{0h}$ and group delay $\beta_{1h}$ being treated as adjustable parameters of the linear fit. The values of $\theta_{0h}$ and $\beta_{1h}$ corresponding to line 302 are 95 degrees and 2 ps, respectively. The line in FIG. 3 that is labeled 304 shows a linear fit of the v-polarization data points that has been generated using Eq. (2), with the phase $\theta_{0v}$ and group delay $\beta_{1v}$ being treated as adjustable parameters of the linear fit.

The values of $\theta_{0v}$ and $\beta_{1v}$ corresponding to line 304 are 85 degrees and 1 ps, respectively.

Referring back to FIG. 2, the signal processing implemented in deskew modules 220$_1$ and 220$_2$ and phase-rotation modules 224$_1$ and 224$_2$ is directed at reducing the values of $\Delta\theta_h(f)$ and $\Delta\theta_v(f)$, e.g., by driving these values for digital signals 226$_1$-226$_2$ and 226$_3$-226$_4$ as close to zero as practically possible. The signal processing implemented in phase/skew estimation module 240 is directed at obtaining and, if necessary, dynamically updating the corresponding values of $\theta_{0h}$, $\theta_{0v}$, $\beta_{1h}$, and $\beta_{1v}$, e.g., as illustrated in FIG. 3, based on digital input signal 236. The obtained values of $\theta_{0h}$, $\theta_{0v}$, $\beta_{1h}$, and $\beta_{1v}$ are then fed back to phase-rotation modules 224$_1$ and 224$_2$ and deskew modules 220$_1$ and 220$_2$ by way of control signals 244$_1$, 244$_2$, 242$_1$, and 242$_2$, respectively.

Deskew module 220$_1$ uses the value of $\alpha_{1h}$ received by way of control signal 242$_1$ to reduce (e.g., substantially cancel) the frequency-dependent I/Q phase skew approximated by the second term in the right-hand side of Eq. (1). Phase-rotation module 224$_1$ then uses the value of $\theta_{0h}$ received by way of control signal 244$_1$ to remove the frequency-independent I/Q phase offset approximated by the first term in the right-hand side of Eq. (1). As a result, the I/Q phase imbalance between digital signals 226$_1$ and 226$_2$ outputted by phase-rotation module 224$_1$ tends to be frequency-independent and relatively close to zero.

Deskew module 220$_2$ similarly uses the value of $\beta_{1v}$ received by way of control signal 242$_2$ to reduce the frequency-dependent I/Q phase skew approximated by the second term in the right-hand side of Eq. (2). Phase-rotation module 224$_2$ then uses the value of $\theta_{0v}$ received by way of control signal 244$_2$ to remove the frequency-independent I/Q phase offset approximated by the first term in the right-hand side of Eq. (2). As a result, the I/Q phase imbalance between digital signals 226$_3$ and 226$_4$ outputted by phase-rotation module 224$_2$ tends to be frequency-independent and close to zero.

In an example embodiment, deskew modules 220$_1$ and 220$_2$ can be implemented using a 4-channel fractional delay filter, such as a Lagrange 4$^{th}$-order interpolator filter. Phase-rotation modules 224$_1$ and 224$_2$ can be implemented using an algorithm that performs a Jones matrix rotation.

Digital signals 226$_1$-226$_4$ are applied to a chromatic-dispersion-compensation (CDC) module 230 for CDC processing therein, and the resulting CDC-processed signals are digital signals 232$_1$-232$_4$. A CDC controller (not explicitly shown in FIG. 2) can be used to appropriately configure, as known in the pertinent art, various configurable elements within CDC module 230 to significantly reduce or substantially cancel the detrimental effects of chromatic dispersion caused by optical transport link 140 (FIG. 1). In an example embodiment, the CDC controller may operate using the processing steps of (i) estimating, based on digital signals 226$_1$-226$_4$, the group delay caused by chromatic dispersion in optical transport link 140 and (ii) setting a configuration of CDC module 230 that compensates the estimated group delay.

Digital signals 232$_1$-232$_4$ generated by CDC module 230 are applied to processing module 234, which is configured to run CMA/MMA-based signal processing that transforms these digital signals into complex-valued digital signals 238$_1$ and 238$_2$, where CMA and MMA stand for constant-modulus algorithm and multi-modulus algorithm, respectively. Eq. (3) provides a mathematical expression of the transformation performed by processing module 234:

$$\begin{pmatrix} a'_1 \\ b'_1 \\ a'_2 \\ b'_2 \end{pmatrix} = H \begin{pmatrix} a_1 \\ b_1 \\ a_2 \\ b_2 \end{pmatrix} \quad (3)$$

where $a_1$, $b_1$, $a_2$, and $b_2$ are the digital values provided in a given time slot by digital signals 232$_1$-232$_4$, respectively; $(a'_1+jb'_1)$ and $(a'_2+jb'_2)$ are the resulting digital complex values of digital signals 238$_1$ and 238$_2$, respectively; and H is the 4×4 transformation matrix given by Eq. (4):

$$H = \begin{pmatrix} H_{11} & H_{12} \\ H_{21} & H_{22} \end{pmatrix} = \begin{pmatrix} h_{1a1a} & h_{1a1b} & h_{1a2a} & h_{1a2b} \\ h_{1b1a} & h_{1b1b} & h_{1b2a} & h_{1b2b} \\ h_{2a1a} & h_{2a1b} & h_{2a2a} & h_{2a2b} \\ h_{2b1a} & h_{2b1b} & h_{2b2a} & h_{2b2b} \end{pmatrix} \quad (4)$$

where $H_{11}$, $H_{12}$, $H_{21}$, and $H_{22}$ are the four 2×2 sub-matrices of the matrix H, with the matrix elements explicitly shown in the right-hand side of Eq. (4).

The type of the algorithm used in module 234 depends on the operative constellation used for the generation of optical signal 130. The CMA algorithm generally works well for a QPSK constellation and other constellations in which constellation points have the same distance from the origin of the coordinate axes. For a QAM constellation the CMA algorithm may need to be augmented or replaced by a suitable MMA algorithm. From the description provided herein, a person of ordinary skill in the art will understand how to select, construct, and/or configure such algorithms for use in module 234. In an example embodiment, the used algorithm enables module 234 to obtain the matrix elements of the matrix H and, if necessary, evaluate these matrix elements as a function of the frequency f.

Figure 4:
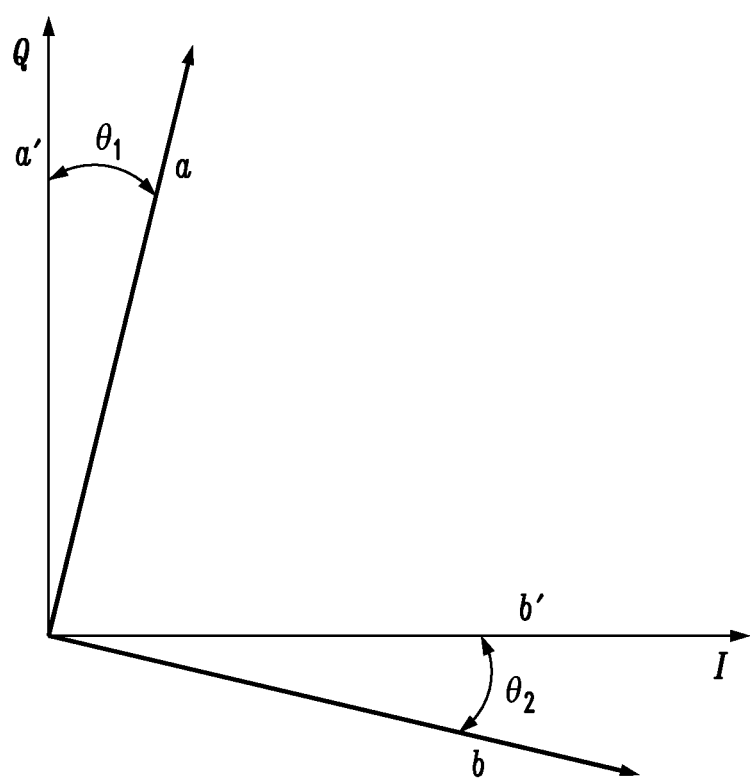
FIG. 4 graphically illustrates a part of the signal processing that can be used in the optical transport system of FIG. 1 according to an embodiment.

FIG. 4 graphically illustrates the relationship between the coordinate axes corresponding to the vectors (a,b) and (a',b'). More specifically, the I and Q axes corresponding to the vector (a',b') are orthogonal to one another. In contrast, the I and Q axes corresponding to the vector (a,b) are typically not orthogonal to one another due to the presence of the above-described I/Q phase imbalance(s). The tilt angle of the Q axis corresponding to the vector (a,b) with respect to the Q axis corresponding to the vector (a',b') is $\theta_1$. The tilt angle of the I axis corresponding to the vector (a,b) with respect to the I axis corresponding to the vector (a',b') is $\theta_2$. In general, $\theta_1 \neq \theta_2$.

Based on these geometric concepts, the rotation that transforms the vector (a,b) into the vector (a',b') can be mathematically expressed as follows:

$$\begin{pmatrix} a' \\ b' \end{pmatrix} = \begin{pmatrix} \cos\theta_1 & -\sin\theta_1 \\ \sin\theta_2 & \cos\theta_2 \end{pmatrix} \begin{pmatrix} a \\ b \end{pmatrix} \quad (5)$$

By comparing Eqs. (4) and (5), one can obtain the following expressions for the angles $\theta_1$ and $\theta_2$ corresponding to the h and v polarizations:

$$\theta_{1h} = \arg(h_{1b1b} - jh_{1b1a}) \quad (6a)$$

$$\theta_{2h} = \arg(h_{1a1a} + jh_{1a1b}) \quad (6b)$$

$$\theta_{1v} = \arg(h_{2b2b} - jh_{2b2a}) \quad (6c)$$

$$\theta_{2v} = \arg(h_{2a2a} + jh_{2a2b}) \quad (6d)$$

The phase $\theta_h$ between the I and Q signal components corresponding to the h polarization is given by Eq. (7a):

$$\theta_h = \theta_{1h} - \theta_{2h} \quad (7a)$$

The phase $\theta_v$ between the I and Q signal components corresponding to the v polarization is similarly given by Eq. (7b):

$$\theta_v = \theta_{1v} - \theta_{2v} \quad (7b)$$

When the matrix H and/or the sub-matrices $H_{11}$ and $H_{22}$ are evaluated by module 234 as functions of the frequency f, the values of the angles $\theta_h$ and $\theta_v$ can also be obtained as functions of the frequency f, thereby providing two sets of data points analogous to those shown in FIG. 3. Those sets of data points can then be provided, by way of digital input signal 236, to phase/skew estimation module 240 and processed therein, e.g., as indicated above, to obtain the values of $\theta_{0h}$, $\theta_{0v}$, $\beta_{1h}$, and $\beta_{1v}$ for use in deskew modules $220_1$ and $220_2$ and phase-rotation modules $224_1$ and $224_2$, respectively.

Referring back to FIG. 2, carrier-recovery module 250 operates to transform complex-valued digital signals $238_1$ and $238_2$ into complex-valued digital signals $252_1$ and $252_2$, respectively. In an example embodiment, carrier-recovery module 250 can be a conventional carrier-recovery module 250 that is configured to (i) estimate the difference $\delta f$ between the carrier frequencies of optical signal 130 and OLO signal 158 and (ii) substantially cancel the effects of this difference, e.g., by multiplying the digital samples provided by digital signals $238_1$ and $238_2$ by the factor $\exp(j \delta f\, t/(2\pi))$ (where t is the time), thereby generating digital samples for digital signals $252_1$ and $252_2$. As already indicated above, the signal processing implemented in carrier-recovery module 250 stops the rotation of the digital samples about the origin and causes the digital samples carried by digital signals $252_1$ and $252_2$ to form distinct clusters (instead of circular bands) on the complex plane, e.g., as indicated in FIG. 5A.

Equalizer 254 operates to transform digital signals $252_1$ and $252_2$ into digital signals $258_1$ and $258_2$. In an example embodiment, equalizer 254 is an adaptive filter that uses a least-mean-square (LMS) algorithm to (i) track certain statistical properties of digital signals $252_1$ and $252_2$ and (ii) use those statistical properties to generate digital signals $258_1$ and $258_2$ in a manner that helps to correct residual signal distortions. Equalizer 254 further uses the parameters of the transformation performed therein to generate digital input signal 256 for phase/skew estimation module 260.

Figure 5A:
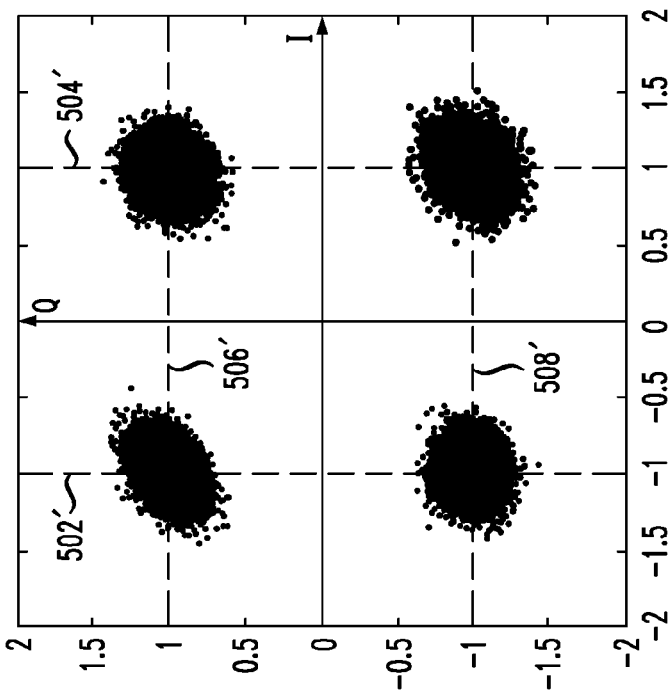
FIGS. 5A-5B graphically illustrate another part of the signal processing that can be used in the optical transport system of FIG. 1 according to an embodiment.
Figure 5B:
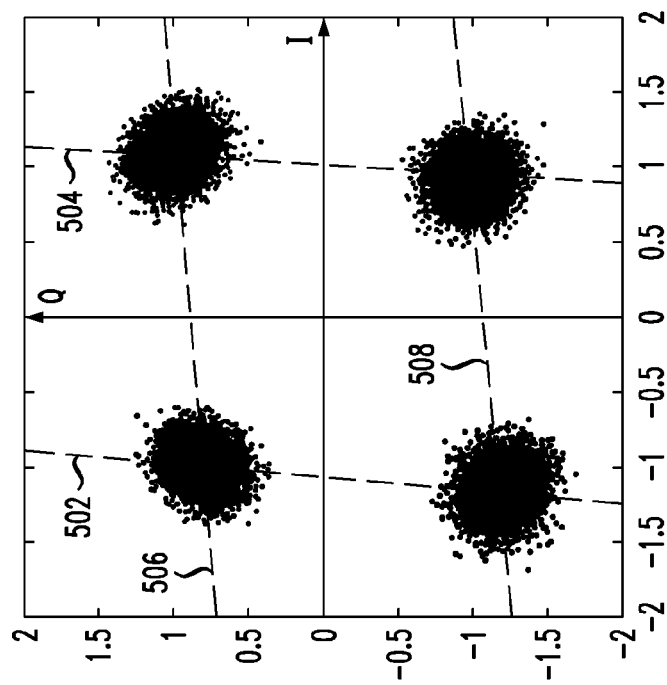

FIGS. 5A-5B graphically illustrate an example signal transformation performed by equalizer 254 according to an embodiment. More specifically, FIG. 5A graphically shows the distribution of digital samples carried by digital signal $252_1$. FIG. 5B graphically shows the corresponding distribution of digital samples carried by digital signal $258_1$. The data shown in FIGS. 5A-5B correspond to an embodiment in which optical signal 130 is generated using a QPSK constellation. A person of ordinary skill in the art will understand that the digital-sample distributions corresponding to digital signals $252_2$ and $258_2$ may be qualitatively similar to those shown in FIGS. 5A and 5B, respectively.

Referring to FIG. 5A, the digital samples carried by digital signal $252_1$ form four distinct clusters on the complex plane, with each cluster representing a corresponding constellation point of the QPSK constellation. Each of the four dashed lines, which are labeled 502-508, is drawn through the centers of gravity of the two corresponding clusters. It is evident from FIG. 5A that lines 502-508 form a non-orthogonal grid. A person of ordinary skill in the art will understand that this lack of orthogonality is caused, at least in part, by the I/Q phase imbalance present at front-end circuit 116 of transmitter 110.

Referring to FIG. 5B, the signal transformation performed by equalizer 254 causes the non-orthogonal set of grid lines 502-508 to be transformed into the corresponding orthogonal set of grid lines 502'-508'. In an example embodiment, this signal transformation can be mathematically expressed using a Jones matrix.

In at least some embodiments, equalizer 254 can be further configured to evaluate the matrix elements of the Jones matrix as a function of the frequency f. As a result, values of the rotation angle $\theta$ of the Jones matrix can be obtained for different frequencies within the signal bandwidth. Analysis of the Jones matrix corresponding to digital signals $252_1$ and $258_1$ will thus yield a set of data points that represents the frequency-dependent phase $\theta_X(f)$ corresponding to the I/Q phase imbalance in the X-polarization channel of front-end circuit 116 of transmitter 110. Analysis of the Jones matrix corresponding to digital signals $252_2$ and $258_2$ will similarly yield a set of data points that represents the frequency-dependent phase $\theta_Y(f)$ corresponding to the I/Q phase imbalance in the Y-polarization channel of front-end circuit 116 of transmitter 110.

In an example embodiment, the two sets of data points representing the phases $\theta_X(f)$ and $\theta_Y(f)$ are qualitatively similar to those shown in FIG. 3. As such, those sets of data points can be provided, by way of digital input signal 256, to phase/skew estimation module 260 and processed therein, e.g., as described above in reference to FIG. 3, to obtain the values of $\theta_{0X}$, $\theta_{0Y}$, $\beta_{1X}$, and $\beta_{1Y}$ for use in phase-rotation modules $624_1$ and $624_2$ and deskew modules $620_1$ and $620_2$, respectively, of the transmitter DSP 112 (see FIG. 6).

In an example embodiment, equalizer 254 can be functionally similar to equalizer 234, with a difference mainly being the type of the used equalization algorithm. More specifically, equalizer 254 is configured to run an LMS-type algorithm, whereas equalizer 234 is configured to run a CMA- or MMA-type algorithm. Phase/skew estimation module 260 can similarly be functionally similar to phase/skew estimation module 240. A person of ordinary skill in the art will understand how to modify Eqs. (1)-(2) to arrive at mathematical expressions that can be used to implement phase/skew estimation module 260.

Referring back to FIG. 2, digital signals $258_1$ and $258_2$ are applied to a decoder 270 that operates to generate output data stream 102 by appropriately processing these digital signals. In an example embodiment, decoder 270 can be a conventional decoder configured to perform constellation-mapping and decoding operations that are compatible with the corresponding operations performed at transmitter 110.

Figure 6:
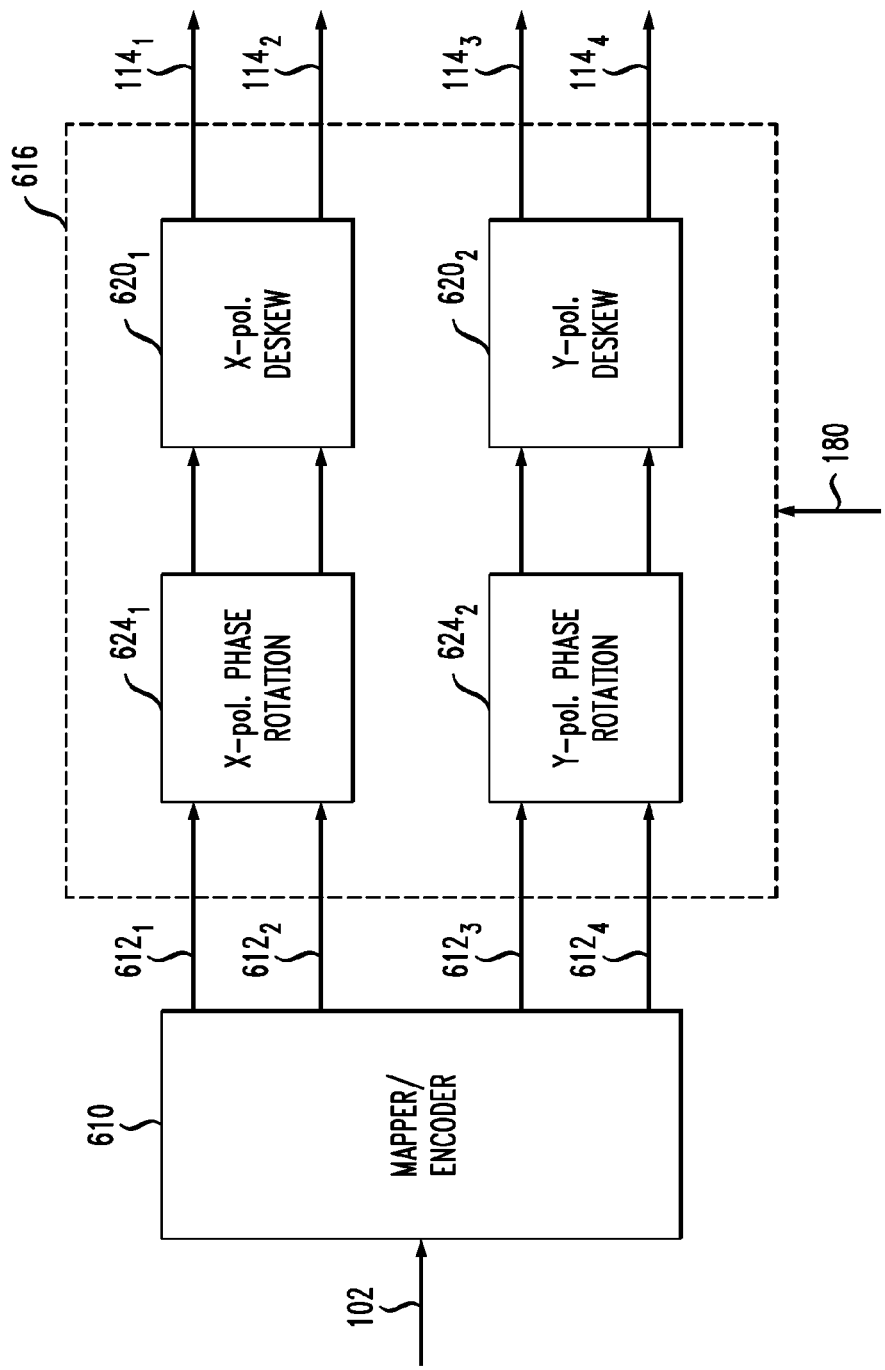
FIG. 6 shows a block diagram of another digital circuit that can be used in the optical transport system of FIG. 1 according to an embodiment.

FIG. 6 shows a block diagram of DSP 112 (FIG. 1) according to an embodiment. Input data stream 102, digital signals $114_1$-$114_4$, and control link 180 are also shown in FIG. 6 to better illustrate the relationship between the circuits of FIGS. 1 and 6. In an example embodiment, DSP 112 comprises a mapper/encoder module 610 and a pre-distortion module 616.

Mapper/encoder module 610 can be a conventional mapper/encoder configured to: (i) demultiplex input data stream 102 into two sub-streams; (ii) add redundancy to each of the sub-streams using a suitable forward-error-correction (FEC) code; (iii) use the operative constellation to transform each of the resulting encoded sub-streams into a corresponding sequence of constellation symbols; (iv) use the real parts of the constellation symbols of the sequence intended for transmission using the X polarization to generate digital signal $612_1$; (v) use the imaginary parts of the constellation symbols of the same sequence to generate digital signal $612_2$; (vi) use the real parts of the constellation symbols of the sequence intended for transmission using the Y polarization to generate digital signal $612_3$; and (vii) use the imaginary parts of the constellation symbols of the same sequence to generate digital signal $612_4$.

Pre-distortion module 616 operates to digitally alter digital signals $612_1$-$612_4$ in a manner that causes the resulting digital signals $114_1$-$114_4$ to have signal components that are substantially canceled by the I/Q phase imbalances in front-end circuit 116 of transmitter 110, thereby causing the I and Q components of each polarization of optical signal 130 to be substantially orthogonal to one another. In an example embodiment, pre-distortion module 616 comprises phase-rotation modules $624_1$ and $624_2$ and deskew modules $620_1$ and $620_2$. Phase-rotation modules $624_1$ and $624_2$ may be similar to phase-rotation modules $224_1$ and $224_2$, respectively. Deskew modules $620_1$ and $620_2$ may be similar to deskew modules $220_1$ and $220_2$, respectively.

For example, phase-rotation module $624_1$ can be configured to use the value of $\theta_{0X}$ received by way of control link 180 from receiver 190 to introduce a frequency-independent I/Q phase offset that is then substantially canceled by the corresponding phase offset caused by the I/Q phase imbalance in the X-polarization channel of front-end circuit 116. Phase-rotation module $624_2$ can similarly be configured to use the value of $\theta_{0Y}$ received by way of control link 180 from receiver 190 to introduce a frequency-independent I/Q phase offset that is then substantially canceled by the corresponding phase offset caused by the I/Q phase imbalance in the Y-polarization channel of front-end circuit 116. Deskew module $620_1$ can be configured to use the value of $\beta_{1X}$ received by way of control link 180 from receiver 190 to introduce a frequency-dependent I/Q phase skew that is then substantially canceled by the corresponding phase skew caused by the I/Q phase imbalance in the X-polarization channel of front-end circuit 116. Deskew module $620_2$ can similarly be configured to use the value of $\beta_{1Y}$ received by way of control link 180 from receiver 190 to introduce a frequency-dependent I/Q phase skew that is then substantially canceled by the corresponding phase skew caused by the I/Q phase imbalance in the Y-polarization channel of front-end circuit 116.

According to an example embodiment disclosed above in reference to FIGS. 1-6, provided is an apparatus (e.g., 100, FIG. 1) comprising: a front-end circuit (e.g., 172, FIG. 1) configured to mix an optical input signal (e.g., 130', FIG. 1) and an optical local-oscillator signal (e.g., 158, FIG. 1) to generate a first electrical digital signal (e.g., $168_1$, FIG. 1) and a second electrical digital signal (e.g., $168_2$, FIG. 1), the first electrical digital signal being a digital measure of a first I component of the optical input signal, and the second electrical digital signal being a digital measure of a first Q component of the optical input signal; and a digital signal processor (e.g., 170, FIG. 1) configured to process the first and second electrical digital signals to recover data (e.g., 102, FIGS. 1, 2) encoded onto the first I and Q components of the optical input signal; wherein the digital signal processor comprises a carrier-recovery module (e.g., 250, FIG. 2) configured to compensate a non-zero frequency difference (e.g., δf) between a carrier frequency of the optical local-oscillator signal and a carrier frequency (e.g., $f_0$, Eq. (1)) of the optical input signal; and wherein the digital signal processor is further configured to: generate an estimate of a first I/Q phase imbalance (e.g., $\Delta\theta_h$, Eq. (1)) using one or more digital signals (e.g., 232, 236; FIG. 2) generated therein before the non-zero frequency difference is compensated by the carrier-recovery module, the first I/Q phase imbalance being an I/Q imbalance caused by the front-end circuit; and generate an estimate of a second I/Q phase imbalance (e.g., $\Delta\theta_X$) using one or more digital signals (e.g., 252, 256; FIG. 2) generated therein after the non-zero frequency difference is compensated by the carrier-recovery module, the second I/Q phase imbalance being an I/Q imbalance caused by an optical transmitter (e.g., 110, FIG. 1) that applied the optical input signal to the front-end circuit.

In some embodiments of the above apparatus, the digital signal processor is further configured to generate the estimate of the first I/Q phase imbalance in a frequency-dependent manner (e.g., $\Delta\theta_h=\Delta\theta_h(f)$, Eq. (1), FIG. 3) within a bandwidth (e.g., from $(f_0-\Delta f)$ to $(f_0+\Delta f)$, FIG. 3) of the optical input signal (e.g., using an approximation expressed by Eq. (1)).

In some embodiments of any of the above apparatus, the digital signal processor is further configured to generate an estimate of a group delay (e.g., $\beta_{1h}$, Eq. (1)) corresponding to the first and second electrical digital signals in the front-end circuit.

In some embodiments of any of the above apparatus, the digital signal processor is further configured to generate the estimate of the second I/Q phase imbalance in a frequency-dependent manner (e.g., $\Delta\theta_X=\Delta\theta_X(f)$) within a bandwidth (e.g., from $(f_0-\Delta f)$ to $(f_0+\Delta f)$, FIG. 3) of the optical input signal (e.g., using an approximation analogous to that of Eq. (1)).

In some embodiments of any of the above apparatus, the digital signal processor is further configured to generate an estimate of a group delay (e.g., $\beta_{1X}$) corresponding to the first I and Q components of the optical input signal at the optical transmitter.

In some embodiments of any of the above apparatus, the digital signal processor is further configured to generate an estimate of a phase difference (e.g., $\theta_{0h}$, Eq. (1)) between the first and second electrical digital signals at the carrier frequency of the optical input signal.

In some embodiments of any of the above apparatus, the digital signal processor is further configured to generate an estimate of a phase difference (e.g., $\theta_{0X}$) between the first I and Q components of the optical input signal at the carrier frequency of the optical input signal.

In some embodiments of any of the above apparatus, the front-end circuit is further configured to mix the optical input signal and the optical local-oscillator signal to generate a third electrical digital signal (e.g., $168_3$, FIG. 1) and a fourth electrical digital signal (e.g., $168_4$, FIG. 1), the third electrical digital signal being a digital measure of a second I component of the optical input signal, and the fourth electrical digital signal being a digital measure of a second Q component of the optical input signal; the digital signal processor is further configured to process the third and fourth electrical digital signals to recover data encoded onto the second I and Q components of the optical input signal; the first I and Q components of the optical input signal have a first polarization of light (e.g., h); and the second I and Q components of the optical input signal having a second polarization of light (e.g., v) that is different from the first polarization of light.

In some embodiments of any of the above apparatus, the digital signal processor is further configured to: generate an estimate of a third I/Q phase imbalance (e.g., $\Delta\theta_v$, Eq. (2)) using one or more digital signals (e.g., 232, 236; FIG. 2) generated therein before the non-zero frequency difference is compensated by the carrier-recovery module, the third I/Q phase imbalance being another I/Q imbalance caused by the front-end circuit; and generate an estimate of a fourth I/Q phase imbalance (e.g., $\Delta\theta_Y$) using one or more digital signals (e.g., 252, 256; FIG. 2) generated therein after the non-zero frequency difference is compensated by the carrier-recovery module, the fourth I/Q phase imbalance being another I/Q imbalance caused by the optical transmitter.

In some embodiments of any of the above apparatus, the digital signal processor is further configured to generate the estimate of the third I/Q phase imbalance in a frequency-dependent manner (e.g., $\Delta\theta_v=\Delta\theta_v(f)$, Eq. (2), FIG. 3) within the bandwidth of the optical input signal (e.g., using an approximation expressed by Eq. (2)).

In some embodiments of any of the above apparatus, the digital signal processor is further configured to generate the estimate of the fourth I/Q phase imbalance in a frequency-dependent manner (e.g., $\theta_Y=\Delta\theta_Y(f)$) within the bandwidth of the optical input signal (e.g., using an approximation analogous to that of Eq. (2)).

In some embodiments of any of the above apparatus, the digital signal processor further comprises an I/Q-imbalance correction circuit (e.g., 220/224, FIG. 2) configured to reduce an adverse effect of the first I/Q phase imbalance on data recovery.

In some embodiments of any of the above apparatus, the I/Q-imbalance correction circuit comprises a fractional delay filter and a one-tap phase rotator.

In some embodiments of any of the above apparatus, the digital signal processor is connectable to a control link (e.g., 180, FIGS. 1-2) and is configured to send out the estimate of the second I/Q phase imbalance (e.g., using values of $\theta_{0x}$ and $\beta_{1X}$) by way of the control link.

In some embodiments of any of the above apparatus, the apparatus further comprises the optical transmitter.

In some embodiments of any of the above apparatus, the optical transmitter is connectable to the control link.

In some embodiments of any of the above apparatus, the optical transmitter comprises a digital pre-distortion circuit (e.g., 616, FIG. 6) configured to reduce an adverse effect of the second I/Q phase imbalance on the first I and Q components of the optical input signal using the estimate of the second I/Q phase imbalance received from the digital signal processor by way of the control link.

In some embodiments of any of the above apparatus, the digital signal processor further comprises: a first equalizer circuit (e.g., 234, FIG. 2) configured to generate a first set of equalized digital signals (e.g., 238, FIG. 2) corresponding to the first and second electrical digital signals and apply the first set of equalized digital signals to the carrier-recovery module; and a first I/Q-imbalance estimation circuit (e.g., 240, FIG. 2) operatively connected (e.g., by way of 236, FIG. 2) to the first equalizer circuit and configured to generate the estimate of the first I/Q phase imbalance using a first set of equalization coefficients (e.g., matrix elements of H, as indicated in Eqs. (4), (6), (7)), the first set of equalization coefficients being used by the first equalizer circuit to generate the first set of equalized digital signals.

In some embodiments of any of the above apparatus, the first equalizer circuit is configured to determine the first set of equalization coefficients using one or both of a CMA algorithm and an MMA algorithm.

In some embodiments of any of the above apparatus, the digital signal processor further comprises: a second equalizer circuit (e.g., 254, FIG. 2) configured to apply further equalization processing to a second set of equalized digital signals (e.g., 252, FIG. 2), the second set of equalized digital signals being generated by the carrier-recovery module in response to receiving the first set of equalized digital signals from the first equalizer circuit; and a second I/Q-imbalance estimation circuit (e.g., 260, FIG. 2) operatively connected (e.g., by way of 256, FIG. 2) to the second equalizer circuit and configured to generate the estimate of the second I/Q phase imbalance using a second set of equalization coefficients, the second set of equalization coefficients being used by the second equalizer in said further equalization processing.

In some embodiments of any of the above apparatus, the second equalizer circuit is configured to determine the second set of equalization coefficients using an LMS algorithm.

In some embodiments of any of the above apparatus, the digital signal processor further comprises a decoder (e.g., 270, FIG. 2) operatively connected to the second equalizer circuit and configured to recover the data encoded onto the first I and Q components of the optical input signal using a third set of equalized digital signals (e.g., 258, FIG. 2), the third set of equalized digital signals being generated by the second equalizer circuit by way of said further equalization processing in response to receiving the second set of equalized digital signals from the second equalizer circuit.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   a front-end circuit configured to mix an optical input signal and an optical local-oscillator signal to generate a first electrical digital signal and a second electrical digital signal, the first electrical digital signal being a digital measure of a first I component of the optical input signal, and the second electrical digital signal being a digital measure of a first Q component of the optical input signal; and
   a digital signal processor configured to:
   process the first and second electrical digital signals to recover data encoded onto the first I and Q components of the optical input signal;
   generate an estimate of a first I/Q phase imbalance using one or more digital signals generated therein, the first I/Q phase imbalance being an I/Q imbalance caused by the front-end circuit; and
   generate an estimate of a second I/Q phase imbalance using one or more digital signals generated therein, the second I/Q phase imbalance being an I/Q imbalance caused by an optical transmitter configured to apply the optical input signal to the front-end circuit.

2. The apparatus of claim 1, wherein the digital signal processor is further configured to generate the estimate of the first I/Q phase imbalance in a frequency-dependent manner within a bandwidth of the optical input signal.

3. The apparatus of claim 2, wherein the digital signal processor is further configured to generate the estimate of the second I/Q phase imbalance in a frequency-dependent manner within the bandwidth of the optical input signal.

4. The apparatus of claim 2, wherein the digital signal processor is further configured to generate an estimate of a group delay corresponding to the first and second electrical digital signals in the front-end circuit.

5. The apparatus of claim 1, wherein the digital signal processor is further configured to generate the estimate of the second I/Q phase imbalance in a frequency-dependent manner within a bandwidth of the optical input signal.

6. The apparatus of claim 5, wherein the digital signal processor is further configured to generate an estimate of a group delay corresponding to the first I and Q components of the optical input signal at the optical transmitter.

7. The apparatus of claim 1, wherein the digital signal processor is further configured to generate an estimate of a phase difference between the first and second electrical digital signals at a carrier frequency of the optical input signal.

8. The apparatus of claim 1, wherein the digital signal processor is further configured to generate an estimate of a phase difference between the first I and Q components of the optical input signal at a carrier frequency of the optical input signal.

9. The apparatus of claim 1,
   wherein the digital signal processor comprises a carrier-recovery module configured to compensate a non-zero frequency difference between a carrier frequency of the optical local-oscillator signal and a carrier frequency of the optical input signal; and
   wherein the digital signal processor is further configured to:
   generate the estimate of the first I/Q phase imbalance using one or more digital signals generated therein before the non-zero frequency difference is compensated by the carrier-recovery module; and
   generate the estimate of the second I/Q phase imbalance using one or more digital signals generated therein after the non-zero frequency difference is compensated by the carrier-recovery module.

10. The apparatus of claim 9, wherein:
   the front-end circuit is further configured to mix the optical input signal and the optical local-oscillator signal to generate a third electrical digital signal and a fourth electrical digital signal, the third electrical digital signal being a digital measure of a second I component of the optical input signal, and the fourth electrical digital signal being a digital measure of a second Q component of the optical input signal;
   the digital signal processor is further configured to process the third and fourth electrical digital signals to recover data encoded onto the second I and Q components of the optical input signal;

the first I and Q components of the optical input signal have a first polarization of light; and the second I and Q components of the optical input signal having a second polarization of light that is different from the first polarization of light.

11. The apparatus of claim 10, wherein the digital signal processor is further configured to:

generate an estimate of a third I/Q phase imbalance using one or more digital signals generated therein before the non-zero frequency difference is compensated by the carrier-recovery module, the third I/Q phase imbalance being another I/Q imbalance caused by the front-end circuit; and generate an estimate of a fourth I/Q phase imbalance using one or more digital signals generated therein after the non-zero frequency difference is compensated by the carrier-recovery module, the fourth I/Q phase imbalance being another I/Q imbalance caused by the optical transmitter.

12. The apparatus of claim 11, wherein the digital signal processor is further configured to generate the estimate of the third I/Q phase imbalance in a frequency-dependent manner within the bandwidth of the optical input signal; and wherein the digital signal processor is further configured to generate the estimate of the fourth I/Q phase imbalance in a frequency-dependent manner within the bandwidth of the optical input signal.

13. The apparatus of claim 1, wherein the digital signal processor comprises an I/Q-imbalance correction circuit configured to reduce an adverse effect of the first I/Q phase imbalance on data recovery.

14. The apparatus of claim 1, wherein the digital signal processor is connectable to a control link and is configured to send out the estimate of the second I/Q phase imbalance by way of the control link.

15. The apparatus of claim 14, further comprising the optical transmitter;

wherein the optical transmitter is connectable to the control link; and wherein the optical transmitter comprises a digital predistortion circuit configured to reduce an adverse effect of the second I/Q phase imbalance on the first I and Q components of the optical input signal using the estimate of the second I/Q phase imbalance received from the digital signal processor by way of the control link.

16. The apparatus of claim 1, wherein the digital signal processor comprises:

a carrier-recovery module configured to compensate a non-zero frequency difference between a carrier frequency of the optical local-oscillator signal and a carrier frequency of the optical input signal;

a first equalizer circuit configured to generate a first set of equalized digital signals corresponding to the first and second electrical digital signals and apply the first set of equalized digital signals to the carrier-recovery module; and a first I/Q-imbalance estimation circuit operatively connected to the first equalizer circuit and configured to generate the estimate of the first I/Q phase imbalance using a first set of equalization coefficients, the first set of equalization coefficients being used by the first equalizer circuit to generate the first set of equalized digital signals.

17. The apparatus of claim 16, wherein the first equalizer circuit is configured to determine the first set of equalization coefficients using one or both of a CMA algorithm and an MMA algorithm.

18. The apparatus of claim 16, wherein the digital signal processor further comprises:

a second equalizer circuit configured to apply further equalization processing to a second set of equalized digital signals, the second set of equalized digital signals being generated by the carrier-recovery module in response to receiving the first set of equalized digital signals from the first equalizer circuit; and a second I/Q-imbalance estimation circuit operatively connected to the second equalizer circuit and configured to generate the estimate of the second I/Q phase imbalance using a second set of equalization coefficients, the second set of equalization coefficients being used by the second equalizer in said further equalization processing.

19. The apparatus of claim 18, wherein the second equalizer circuit is configured to determine the second set of equalization coefficients using an LMS algorithm.

20. The apparatus of claim 18, wherein the digital signal processor further comprises a decoder operatively connected to the second equalizer circuit and configured to recover the data encoded onto the first I and Q components of the optical input signal using a third set of equalized digital signals, the third set of equalized digital signals being generated by the second equalizer circuit by way of said further equalization processing in response to receiving the second set of equalized digital signals from the second equalizer circuit.

* * * * *